Aug. 29, 1950  R. J. SHORT ET AL  2,520,570
METHOD FOR PRODUCING DETERGENT BLOCKS

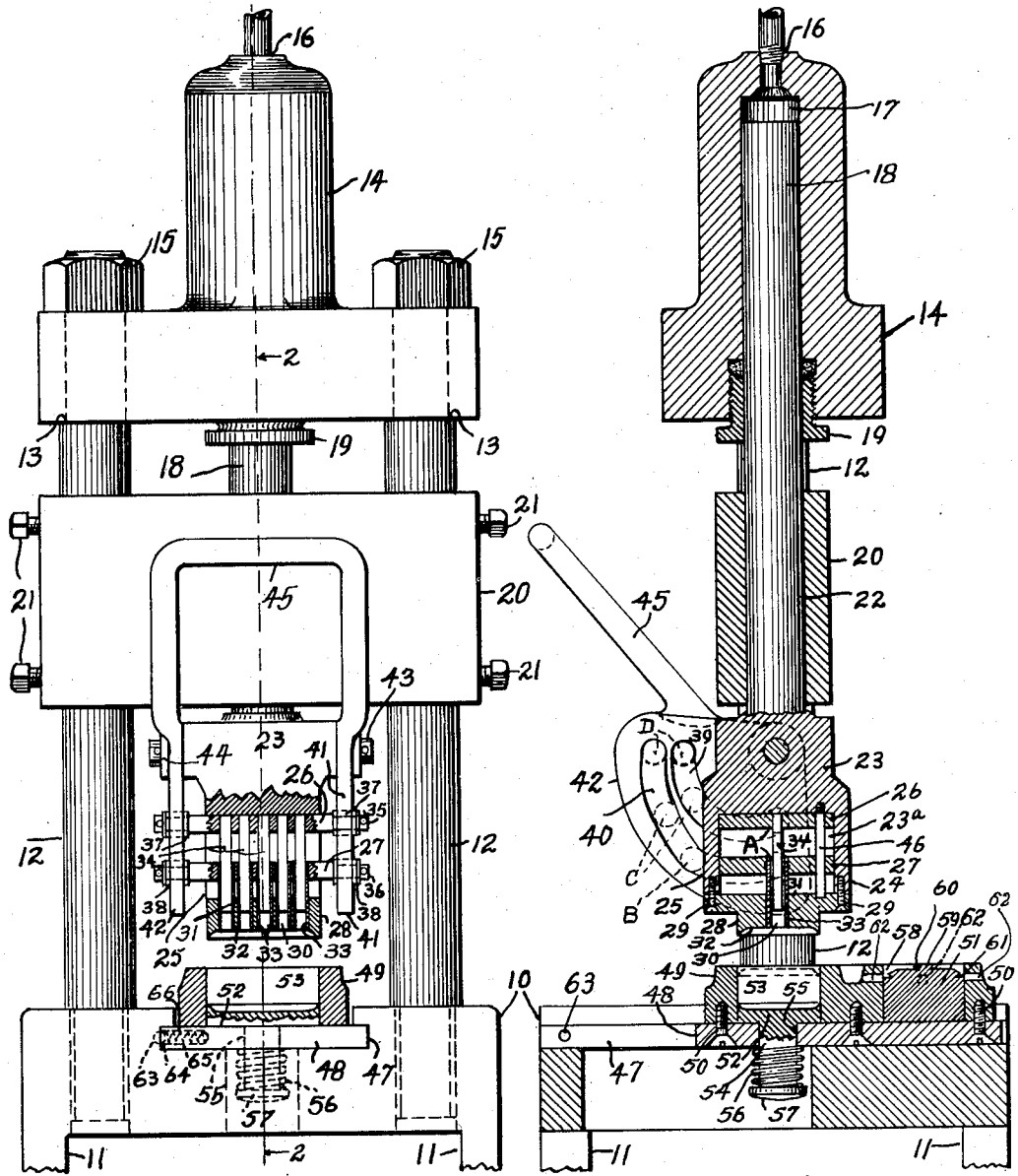

Filed May 1, 1945  2 Sheets-Sheet 2

Robert J. Short
George M. Woodruff.
INVENTORS.

BY Allen & Allen
Attorneys

Patented Aug. 29, 1950

2,520,570

UNITED STATES PATENT OFFICE 2,520,570

METHOD FOR PRODUCING DETERGENT BLOCKS

Robert J. Short, Wyoming, and George M. Woodruff, Cincinnati, Ohio, assignors to The Procter & Gamble Company, Cincinnati, Ohio, a corporation of Ohio Application May 1, 1945, Serial No. 591,290

3 Claims. (Cl. 18—59)

1

This invention relates to a process for the manufacture of formed cakes of plastic material containing distinctive colored inserts.

The principal object of the invention is to provide a process for inlaying distinctive inserts in a plastic condition in detergent bars without forming a cavity for the insert in a separate operation with a separate die.

Another object is to provide a process which is controllable and which gives uniform results in the production of trim detergent bars with distinctive inserts.

In accomplishing the above objects in accordance with the present invention, the insert is first formed by forcing plastic detergent, preferably of distinctive color, into a tubular sleeve die or former whose cross sectional outline of the outside surface corresponds to the desired shape of the insert and whose inside surface at least substantially corresponds thereto. The depth to which the plastic insert material is forced into the sleeve die and therefore the length of the insert formed is controlled by a plunger having controlled movement within the sleeve die. Then the sleeve die containing the insert backed by the plunger is employed as a solid plunger die and is forced the desired depth into a blank plastic detergent bar which is held in a suitable bar mold of desired shape, thereby simultaneously forming the cavity for the insert and positioning the insert therein. The sleeve die is then withdrawn from the detergent cake and simultaneously the plunger within the tubular sleeve die is moved toward the cake compressing the insert material and forcing the same into the cavity as the sleeve die is withdrawn, thereby fixing the insert in the cake. The invention will now be described more specifically with the aid of the appended drawings in which an apparatus for conducting the process is shown.

Figure 1 shows an elevation front view of an apparatus suitable for use in the practice of our invention, essential parts of the insert mechanism being shown partly in section;

Figure 2 is a sectional view taken on line 2—2 of Figure 1 showing more clearly the cam arrangement for operating the sleeve die and plunger mechanisms;

Figure 3:
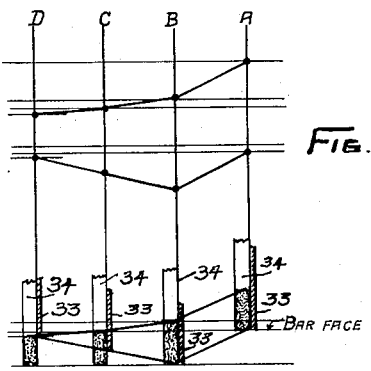
Figure 4:
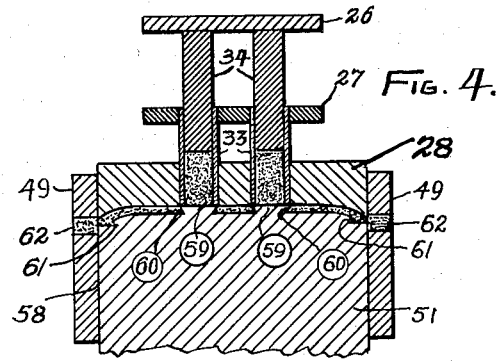
Figure 5:
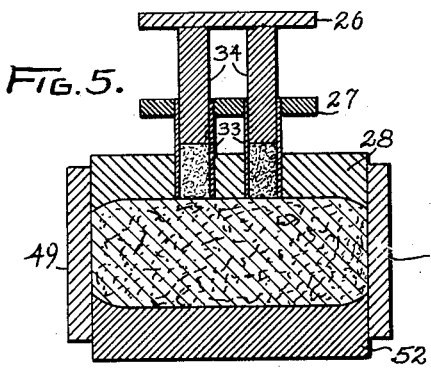
Figure 6:
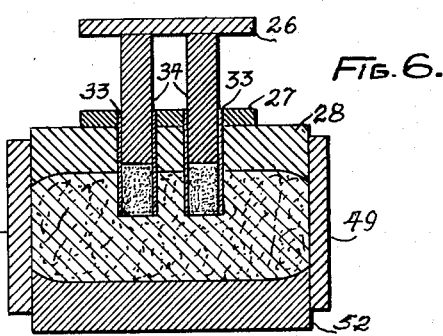
Figure 7:
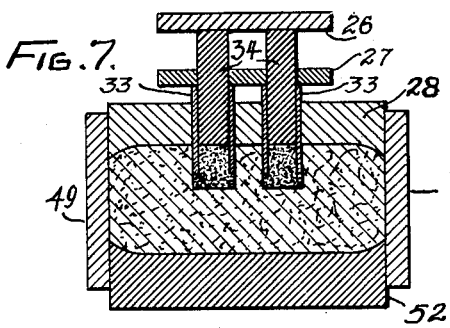
Figure 8:
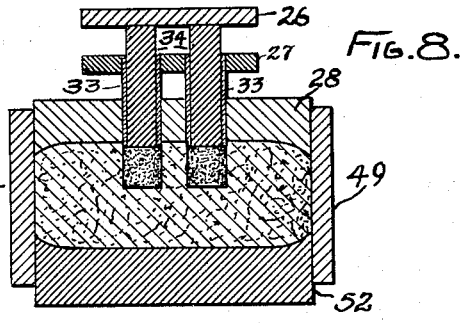
Figure 9:
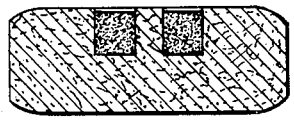

Figure 3 diagrammatically shows the relative sleeve die and plunger positions at various stations on the cam;

Figure 4 is a sectional view diagrammatically showing the relative positions of insert elements of the apparatus at the end of the stage where the detergent insert has been formed within the sleeve die;

Figure 5 is a sectional view diagramatically showing the detergent bar positioned in the bar die box with plunger and sleeve die containing the insert at Station A of Figure 3;

Figure 6 is similar to Figure 5 and shows the relative positions of insert elements after the insert has been forced into the detergent bar but before the sleeve die has been withdrawn. This position corresponds to station B of Figure 3;

Figure 7 is similar to Figures 5 and 6 and shows the relative sleeve die and plunger positions at station C of Figure 3;

Figure 8 is similar to Figures 5, 6 and 7 and shows the relative sleeve die and plunger positions at station D, and Figure 9 is a cross section of a finished soap bar containing the inserted distinctive detergent.

Referring first to Figures 1 and 2, numeral 10 indicates a soap press base provided with suitable supports 11 and having a pair of anchor posts 12 rigidly mounted thereon. The end of each anchor post opposite the base end is turned down so as to provide a shoulder 13 on which is mounted a hydraulic cylinder 14 held rigidly against the shoulders 13 in a suitable manner, the use of nuts 15 being shown. The head of the hydraulic cylinder is tapped as at 16 to provide for a pipe connection leading to a source of hydraulic pressure not shown.

The hydraulic cylinder 14 is provided with a bore 17 along its main axis in connection with the tapped portion 16 to which is attached the source of hydraulic supply. The bore 17 is adapted to accommodate piston 18 for vertical movement, a suitable packing gland 19 being provided at the opposite end of bore 17 to permit movement of the piston 18 within the bore under pressure without appreciable loss of hydraulic fluid.

A guide bearing 20, which is preferably adjustable as to vertical position between the hydraulic cylinder 14 and base 10, is mounted rigidly on guide posts 12 and held in position by means of set screws 21 thereby providing a suitable bearing surface 22 for the piston 18 and a means for maintaining the piston in vertical alignment with the bore 17 of the hydraulic cylinder 14.

The lower end of the piston 18 is provided with a die plunger block 23 on and within which is mounted a mechanism for inserting the distinctive inserts into the detergent bar. This die plunger block at its lower end is provided with a cavity 23a, the sides 24 and 25 acting as guides for the plunger plate 26 and the sleeve die plate 27, as more fully described below.

On the bottom of the die plunger block 23 is mounted by means of screws 29, for example, the top die 28 for forming one face of the detergent bar. The bottom die for the opposite face of the bar is described below. The top die 28 is provided with one or more apertures 30 corresponding to the shape of the desired insert and extending from the inside cake engaging surface 32 to the outside surface 31. In the present instance we have illustrated our invention in Figures 1 and 2 with the use of an insert mechanism adapted to produce bars with four cylindrical detergent inserts of distinctive color; only two such inserts are shown in Figures 4 to 9 and it should be understood that the method and apparatus herein described and claimed is equally applicable in forming bars with any other type of insert especially in regard to form and number. For example, it may be desirable to use a single letter or group of letters spelling a name or trade-mark, or it may be desirable to give the insert figurative form such as an animal, human head, boat, etc., and it should be understood that the invention is not limited in this respect.

Each aperture 30 in the top die 28 is provided with a tubular sleeve die 33 which slidably engages the walls of the aperture and whose shape conforms to that of the inner walls thereof. The sleeve die 33 is fixed in an aperture in the sleeve die plate 27 and is movable vertically with the plate.

Depending from the plunger plate 26 and in vertical alignment with the sleeve die 33 is a plunger 34 which sildably engages the inner walls of the sleeve die 33.

The movements of the plunger 34 and sleeve die 33, and their positions relative to each other at all stages of operation, are controlled by a cam mechanism which, for the purposes of describing the present invention, is shown to be hand operated.

The plunger plate 26 and sleeve die plate 27 are each provided with shaft-like extensions 35 and 36 respectively extending from opposing vertical sides, as shown in Figure 1. On these extensions are mounted pairs of cam rollers 37 and 38 adapted to engage cam grooves 39 and 40 of parallel plate cams 41 and 42, which are rotatably mounted on shaft-like extensions 43 and 44 projecting from opposing sides of the die plunger block 23. By means of rigidly attached hand lever 45 parallel plate cams 41 and 42 may be moved simultaneously, thereby operating plunger 34 and sleeve die 33 through stations A, B, C, and D shown in Figure 2 and diagrammatically illustrated in Figure 3. Suitably disposed guide pins 46 are preferably positioned in the cavity 23a of the plunger block 23 to maintain the plunger plate 26 and sleeve die plate 27 in vertical alignment.

The complete operation of the machine will be fully understood from the operational description given below. However in order that the operation of the cam mechanism may be fully understood at this stage of the description, an explanation is given here, reference being had especially to Figure 3.

The letter A represents the cam station at the beginning of the insertion. When the plate cams 41 and 42 are moved from station A to station B, the sleeve die 33 containing insert material, forced therein as described below, and plunger 34 are simultaneously moved into the position where maximum depth of insertion into the detergent bar is effected, the relative positions of the sleeve die and plunger remaining the same. As the plate cams 41 and 42 are then moved through station C to station D, the sleeve die 33 is withdrawn while the plunger 34 continues its movement toward the detergent bar forcing distinctive insert material into the cavity left by the withdrawn sleeve die 33. The preferred design of insert elements and their operation is such that the volume of detergent material forced into the bar during withdrawal of the sleeve die is slightly greater than the cavity formed, thereby insuring the locking of the insert in the detergent bar.

At station D, the completion of the inserting operation, the ends of the members come to a stop substantially adjacent each other at a level preferably slightly below the level of the face of the detergent bar, as will be more fully described below, thereby forming a depression in the face of the detergent bar corresponding to the cross sectional shape of the insert.

The cam mechanism shown in the drawings and described above is not a limitation of the invention. For example, changes in design and dimensions as may be necessitated by change in design of sleeve die or in the degree of insertion may be made without departing from the spirit of the invention.

Having thus covered a description of the top die 28, the insert mechanism and related elements, attention is now directed to the bottom die and to means associated therewith for loading the sleeve die 33 with distinctive detergent material.

The base 10 is provided with grooves 47 adapted to provide for the slidable engagement of the die slide plate 48 on which is affixed the die box 49 in any suitable manner, as by screws 50. As will be apparent from Figure 2 of the drawings, the die box 49 is provided with an injection die 51, employed in forcing distinctive insert material into sleeve die 33, and bottom die 52, either of which may be brought into registry with top die 28 by sliding the die slide plate 48. It is apparent also that the bottom die 52 in combination with top die 28 and the vertical sides of cavity 53 provided in the die box 49 form the detergent bar mold.

The bottom die 52 is provided with a short shaft extension 54 which extends through an aperture 55 in the die slide plate 48. A spring 56 held under compression over shaft 54 against the bottom of the die slide plate 48 by head 57 provides means whereby the bottom die is returned to position after having been raised by hand or otherwise to eject a stamped bar. The base casting 10 is suitably constructed to provide a space for movement of this extension during sliding of the plate 48.

The injection die 51 is suitably placed in cavity 58 of die box 49 and on its top face are provided lugs 59 adapted to register with the apertures 30 in the top die 28 when the injection die 51 is positioned for the insertion of the plastic distinctively colored insert material into the tubular sleeve die 33, as will be apparent from the operational description below. The edges of the lugs 59 are preferably designed to contact the lower edges of sleeve dies 33 or of apertures 30 in top die 28, or substantially so, at the end of the operation in which the insert material is forced into the sleeve dies 33. A weakened line of contact is thus formed between the insert material within the sleeve dies 33 and the remainder of this material in the clearance space between the injection die 51 and top die 28, thereby providing for clean rupture when the die plunger block 23 is raised preparatory to forcing the inserts into the detergent bar. With suitably controlled mechanism the material in the sleeve dies 33 may actually be severed from the excess, but it is not necessary that complete severance be effected. Weakening the line of contact without actually establishing a separation of the insert from the excess material above the insert die 51 is sufficient to permit a clean break of these two bodies of detergent when the die plunger block is raised.

Although the detergent contacting surface 32 of the top die 28 may be suitably lubricated to prevent the insert material from sticking thereto, we find it advantageous to provide the lugs 59 with undercut edges 60 which fill with the insert detergent material and thereby assist in disengaging the insert material from the face of the top die 28. For the same reason the outer edges of the injection die 51 may be undercut as at 61.

Aperatures 62 are also provided in the sides of the die box 49 communicating with the interior of the cavity 58 partially occupied by the insertion die 51 and so positioned as to provide for an escape of excess insert detergent material when the die plunger block 23 is forced into position over die 51 containing a suitable amount of plastic insert detergent material whereby the insert material is caused to flow into the sleeve die 33. The size of the escape opening is of course sufficiently small so that the detergent material will flow therethrough only after the sleeve die is filled.

It has been pointed out above that grooves 47 are provided in base 10 to accommodate the die slide plate 48, to which is attached the die box 49, and permit registry of either insert die 51 or lower die 52 with the top die 28. To facilitate in the registry of these two dies, indentations 63 are suitably positioned in the groove 47 for the registry of ball bearing 64 backed by spring 65 mounted in pocket 66 of the slide die plate 48. Other equivalent means of locating positions of registry may also be used.

In the operation of our process, shown stepwise in Figures 4 to 8 inclusive, an amount of distinctive insert material, normally in the form of a thin slab of colored soap and somewhat in excess of the amount necessary to form inserts of the desired shape and size, is positioned in the cavity above the injection die 51. At this point the die plunger block 23 is in a raised position and the plate cams 41 and 42 are located at station A, as shown in Figure 2. The die slide plate 48 and affixed die box 49 are moved so that the injection die 51 is in registry with the top die 28. Hydraulic fluid under pressure is then admitted into bore 17 and the top die 28 is forcibly moved down into the cavity above the injection die 51 causing distinctive insert detergent material contained therein to move by plastic flow into the tubular sleeve die 33, the amount being limited and controlled by the position of the plunger 34. The faces of the top die and of the injection die and the cavity of the injection die are so related in shape and dimension as to result in the squeezing of the distinctive detergent material into the openings of the sleeve dies, thus filling them insofar as is permitted by the plungers 34. Sufficient clearance is preferably provided between plunger 34 and the sleeve die 33 to permit the escape of air as the insert material is forced into the tubular sleeve die, but the clearance is not sufficient to permit passage of plastic detergent. The relative positions of the various elements at the end of this operation are diagrammatically shown in Figure 4.

After formation of the insert has been completed, hydraulic pressure is released and the die plunger block 23 is raised. The die slide plate 48 and die box 49 are then moved so that the bottom die 52 is in registry with the top die 28. A blank bar of detergent is positioned in the bottom die 52 and with plate cams 41 and 42 at station A hydraulic fluid is introduced into the bore 17 of the cylinder 14 thereby forcing the die plunger block 23 into stamping relationship with the blank bar of detergent contained in bottom die 52. The blank bar is thereby given the shape of the mold. This position is shown in Figure 5.

Reference is now made to Figure 6. After the top die 28 with filled tubular sleeve die 33 has been brought into stamping relationship with the blank bar and shape of the mold has been given to the bar, and while he top die is held in position under pressure, plate cams 41 and 42 are moved with the aid of hand lever 45 to station B. In so moving the plate cams the plunger 345 and sleeve die 33 with insert material contained therein are simultaneously forced into the molded bar, preferably without change in relative position. The sleeve die 33 and contained insert material thus act as an insert cavity former. The increase in volume in the soap cake brought about by this insertion is taken care of by the yieldable manner in which the top die 28 is held in position by the hydraulic mechanism including piston 18. This is the preferred arrangement since positive pressure is applied at all times during the bra-forming operation and a well molded bar results.

However, if the top die is operated by purely mechanical means instead of by the hydraulic means shown, then provision for mechanical movement of the top die can be included in the apparatus to compensate for the increase in volume of the bar caused by the insertion of the sleeve die 33 and the contained insert material. Other means may be employed to accomplish this end without departing from the spirit of the invention.

The depth to which the insert is forced into the detergent bar is not a limitation of the invention, but we find that when the distinctive insert includes letters of the alphabet, then the insertion is advantageously made only halfway into the bar. Suitable adjustments and design of plate cams may be provided for consistently limiting the depth of this insertion which may be through the bar to the face of the bottom die if desired. The relative positions of the plunger, tubular sleeve die, etc., at the end of this processing step are shown in Figure 6.

After the insert sleeve die 33 with insert has been pressed into the detergent bar the desired depth, the plate cams 41 and 42 are moved through station C to station D, in which operation the sleeve die is withdrawn and simultaneously with this withdrawal the plunger 34 compresses the insert material and forces the same into the cavity left by the sleeve die 33. The insert thus fits tightly in the cavity. Figure 7 diagrammatically illustrates the relative positions of the various parts when station C has been reached.

Figure 8 diagrammatically illustrates the relative positions of the elements at station D. It will be noted that the edges of the plunger 34 and of the sleeve die 33 are adjacent and preferably slightly below the face of the bar thereby pressing the insert in the face of the bar. However, such insertion of the insert may stop at the face of the bar, in which case it may or may not be desirable to stamp the bar subsequently depending on the finished appearance that is desired.

Hydraulic pressure is thereupon released, the die plunger block 23 is raised, and the stamped bar containing the insert is ejected by raising the bottom die 52 in the die box 49 against the compression of spring 56.

It is to be understood that the operation of the plate cams has been described stepwise in order to simplify the description and that in actual operation movement from station A to station D may be continuous without change in the final result.

The detergent bar containing the distinctive detergent insert may be subjected to a final stamping operation to impart to the bar a polished or finished appearance that it may not otherwise have, and to insure locking the insert in position. Such added step, however, is not essential or necessary in realizing the benefits of our invention.

From the above description of the present process and apparatus, it will be noted that the sleeve die for the insert material is loaded and discharged from the same opening, that positive control is exercised in the formation of the insert, and that the use of a separate plunger die to form the insert cavity in the bar is eliminated. Other advantages, including ease of adaptation to automatic machine practice, will be obvious. It is also obvious that the process herein described and claimed may be practiced either by hand or by the use of automatic mechanical devices constructed in a manner such that the individual elements of the machine carrying out the various operations of the process may be suitably synchronized.

Having thus described our invention, what we claim and desire to secure by Letters Patent is:

1. In the process of making a detergent bar containing a distinctive detergent insert, the steps of confining a blank, solid, plastic detergent bar under yielding pressure, forcing into said bar a hollow insert former filled with a distinctive plastic insert detergent material in amount not exceeding the amount necessary for forming said insert, while holding said distinctive plastic detergent insert material in substantially stationary position with respect to said insert former during said forcing step, thereby displacing plastic detergent of the bar and forming a cavity therein, and thereafter withdrawing said insert former while simultaneously expelling the said insert material therefrom so that said insert material remains in the cavity of said bar.

2. The process claimed in claim 1 in which during the withdrawal of said hollow insert former said insert material is expelled therefrom so as to be forced into that part of the cavity left by the withdrawal of the hollow insert former, to fill it progressively as the said hollow insert former is withdrawn.

3. In the process of making a detergent bar containing a distinctive detergent insert, the steps of stamping a blank, solid, plastic detergent bar under yielding pressure whereby said bar is forced to fill a bar mold and attain the shape thereof, forcing into a hollow insert sleeve die a distinctive plastic insert material in an amount not exceeding the amount necessary for forming said insert, and while said bar is confined under yielding pressure within said mold, forcing into said confined bar said hollow insert sleeve die while holding said distinctive plastic detergent insert material in substantially stationary position with respect to said sleeve die whereby to displace plastic detergent of the bar and form a cavity therein, and thereafter withdrawing said insert sleeve die, leaving the said insert material in said cavity while simultaneously forcing the distinctive plastic detergent insert material to fill that portion of the cavity left by withdrawal of said hollow sleeve die.

ROBERT J. SHORT.
GEORGE M. WOODRUFF.

REFERENCES CITED

The following references are of record in the file of this patent:

UNITED STATES PATENTS

| Number | Name | Date |
|---|---|---|
| 240,157 | Maxwell | Apr. 12, 1881 |
| 356,200 | Ives | Jan. 18, 1887 |
| 604,590 | McColl | May 24, 1898 |
| 1,191,831 | Royer et al. | July 18, 1916 |
| 1,312,424 | Richardson | Aug. 5, 1919 |
| 2,125,123 | Mottur | July 26, 1938 |
| 2,213,772 | Strain | Sept. 3, 1940 |
| 2,230,189 | Ferngren | Jan. 28, 1941 |
| 2,260,667 | Hoof | Oct. 28, 1941 |
| 2,344,901 | Routh | Mar. 21, 1944 |
| 2,423,576 | Block | July 8, 1947 |

FOREIGN PATENTS

| Number | Country | Date |
|---|---|---|
| 1,877 | Great Britain | 1913 |